United States Patent [19]

Smith

[11] Patent Number: 4,459,653

[45] Date of Patent: Jul. 10, 1984

[54] APERTURED TRANSFORMER AND INVERTER USING SAME

[75] Inventor: Alan M. Smith, Hendersonville, N.C.

[73] Assignee: General Electric Company, Schenectady, N.Y.

[21] Appl. No.: 436,554

[22] Filed: Oct. 25, 1982

[51] Int. Cl.[3] .......................................... H02M 7/537

[52] U.S. Cl. .................................. 363/131; 315/221; 315/276; 323/331; 323/351; 331/112; 336/155; 336/172

[58] Field of Search ...................... 336/155, 172, 215; 323/351, 331; 331/41, 55, 112, 149; 315/221, 315/219, 223, 276; 363/131

[56] References Cited

U.S. PATENT DOCUMENTS 3,372,283 3/1968 Jaecklin .............................. 336/155
3,963,958 6/1976 Nuckolls ............................ 315/276
4,258,338 3/1981 Peil ..................................... 331/112
4,259,716 3/1981 Harris et al. .......................... 363/97
4,276,496 6/1981 Arena-Ochoa ...................... 363/131
4,307,334 12/1981 Peil et al. ........................... 323/351

*Primary Examiner*—William H. Beha, Jr.
*Attorney, Agent, or Firm*—Ernest W. Legree; Philip L. Schlamp; Fred Jacob

[57] ABSTRACT

A bifluxer type transformer for use in a static inverter utilizes an E-E or shell-type core. Such configuration is particularly suitable for ballasting hid lamps because it minimizes stray flux which causes eddy current losses in the luminaire metal enclosure. A pair of apertures are provided in the yoke area, one above and the other below the central leg, around which the main winding is wound. Control windings are looped through the apertures and provide feedback from the output to the input of a power transistor as a result of linkage by transverse flux.

6 Claims, 2 Drawing Figures

APERTURED TRANSFORMER AND INVERTER USING SAME

The invention relates to an inverter particularly suitable for the operation of gaseous discharge lamps and to an improved transfluxer-type transformer which may be termed a bifluxer in an E-core configuration, for use therein.

BACKGROUND OF THE INVENTION

Static inverters are devices in which electrical energy in the dc form is converted to the ac form through static means. Typically in such inverters a dc source produces a current through a semiconductor device such as a power transistor connected in series with the primary winding of a power transformer and generates an ac output in the transformer secondary winding as the semiconductor device is switched. The inverters include control windings which are coupled to a control electrode of the semiconductor device to effect switching. The transformer core may be provided with apertures dividing the core into localized branches. One branch is designed to saturate first, and upon saturation to reduce the regenerative and increase the degenerative feedback applied to the transistor through the control windings in order to effect switching with maximum efficiency. Such arrangements known as transfluxers are described in U.S. Pat. Nos. 3,914,680 and 4,002,999 to Hesler et al, assigned like the present invention.

In U.S. Pat. No. 4,259,716—Harris et al, Transformer for Use in a Static Inverter, assigned like the present invention and whose dislosure is incorporated herein by reference, a static inverter utilizing a U-U or core-type transformer is disclosed. The transformer configuration described in that patent, sometimes referred to as a bifluxer, is very efficient and provides a good waveform in the base drive which it supplies to the power transistor.

SUMMARY OF THE INVENTION

The E-E or shell-type inductor or transformer is preferred to the U-U or core type for use as ballast in luminaires or lighting fixtures because it is more effective in confining magnetic flux to the core. Stray flux produces eddy currents in the metal enclosures of luminaires which increase ballast losses considerably. The object of the invention is to achieve the advantages of bifluxer operation in an E-E or shell type transformer configuration.

In accordance with the invention, bifluxer operation is achieved in an E-E transformer core configuration by means of a pair of apertures through the core, one in the yoke area above and the other in the yoke area below the central leg. By the yoke is meant the portions of the core which join the central leg to the side legs. These locations are readily accessible notwithstanding the fact that the main transformer windings are wound around the central leg, and avoid the unbalance which would result from side leg locations.

In a prefered embodiment, a pair of apertures of substantially equal size are provided through a ferrite core on the centerline of the central leg, one immediately above and the other immediately below the junction line of the central leg with the yoke portions. The transformer core is used in an inverter comprising a relaxation oscillator serving to start a main blocking oscillator which generates the ac output and the feedback control windings for both oscillators are threaded through the aperture pair.

DETAILED DESCRIPTION

Figure 1:
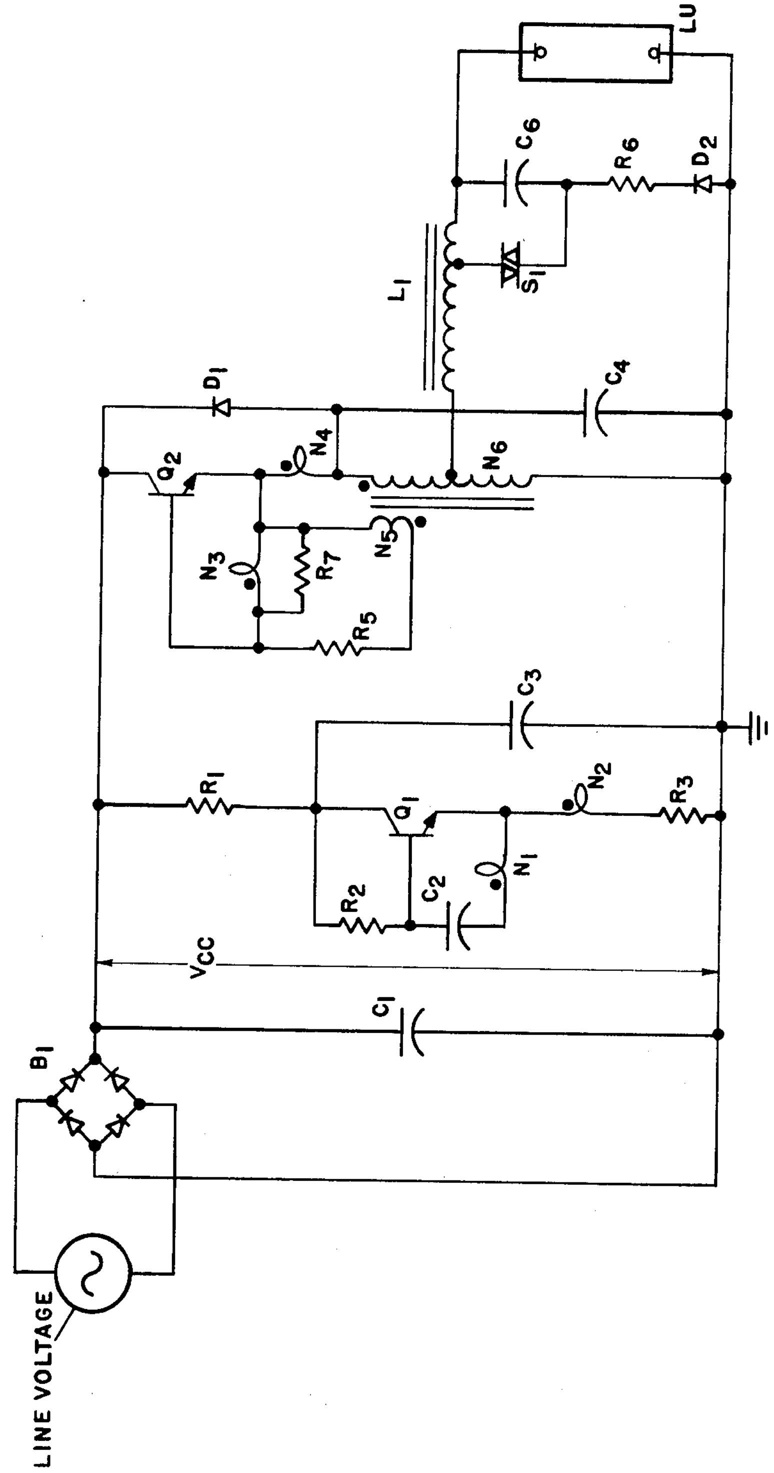
FIG. 1 is a schematic circuit diagram of a static inverter and ballast for a gaseous discharge lamp using the E core bifluxer of the invention.

Referring to FIG. 1, the schematic circuit represents a dc to ac inverter using an E-E core bifluxer for converting dc electrical energy to 25 khz ac for operating a high intensity discharge lamp LU. The dc is obtained from 120 v 60 hz ac by a conventional bridge rectifier $B_1$ and electrolytic storage capacitor $C_1$. The dc voltage across the storage capacitor will be referred to as $V_{cc}$ (voltage collector to common). The conventional ground sign as used herein represents a circuit common only.

The inverter proper utilizes a start oscillator comprising signal transistor $Q_1$ connected in a relaxation oscillator circuit, and a main oscillator comprising power transistor $Q_2$ connected in a blocking oscillator circuit. The 25 khz output of the blocking oscillator is supplied to lamp LU through a ballast in the form of a series inductive reactance $L_1$.

Lamp LU by way of example may be a 100 watt high pressure sodium vapor lamp having an operating arc drop of about 55 volts. Such a lamp requires high voltage pulses to start it and they are generated by the starting circuit comrising capacitor $C_6$, sidac $S_1$, resistor $R_6$ and diode $D_2$. Capacitor $C_6$ is charged slowly through $R_6$ and $D_2$ and is discharged suddenly through a few turns at the output end of $L_1$ when the sidac (or equivalent voltage sensitive switch) breaks down. During discharge $L_1$ acts as a pulse transformer providing 3000 volts or more across the lamp to start it. The circuit becomes quiescent after the lamp is started because the voltage drop across it is not enough to break down the sidac. Such starting circuits are disclosed in U.S. Pat. No. 3,963,958—Nuckolls, Starting and Operating Circuit for Gaseous Discharge Lamps, assigned like this application.

Figure 2:
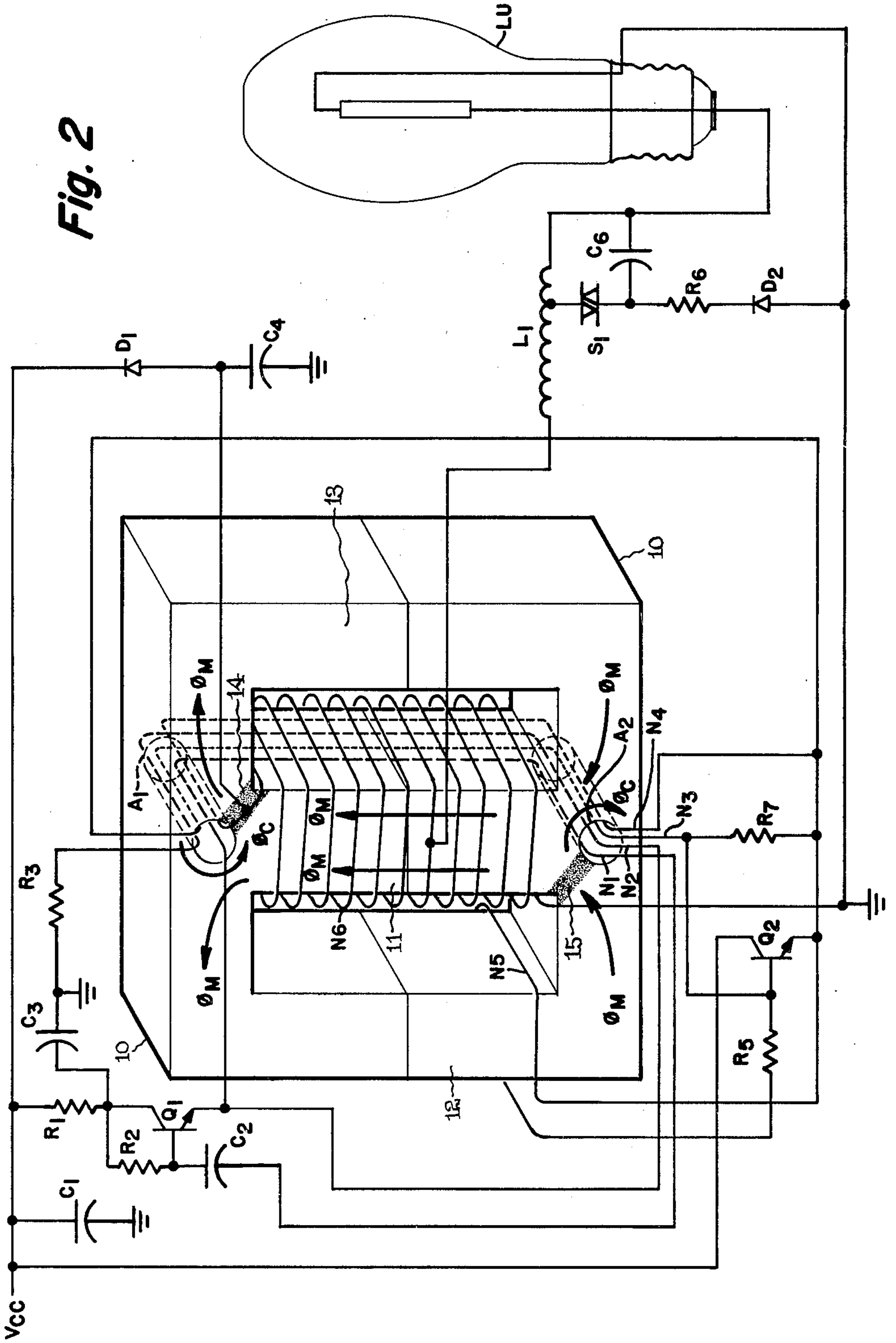
FIG. 2 is a pictorial representation of the novel E-E transformer of the invention with some circuit features diagrammatically represented.

Both oscillators of the inverter utilize control windings on novel transformer 10 shown in FIG. 2. It is a shell-type transformer comprising two facing E cores of ferrite. The main winding $N_6$ is wound around the central leg 11 of the core. By way of example suitable for the above lamp, the outside dimensions of the core are $2\frac{5}{8}'' \times 2\frac{5}{8}'' \times \frac{1}{2}''$ and the main winding $N_6$ has 112 turns tapped for output to $L_1$ at 60 turns from circuit common. In accordance with the invention two apertures $A_1$ and $A_2$ are provided on the centerline of the central leg. They are located in the upper and lowr yoke portions of the core that join the central leg 11 to the side legs 12, 13. Control windings $N_1$ to $N_4$ are threaded or wound through apertures $A_1$, $A_2$. Control winding $N_5$ is wound around side leg 12 of the core.

In operation, the voltage $V_{cc}$ across $C_1$ furnishes current which charges capacitor $C_3$ through resistor $R_1$ and at the same time charges capacitor $C_2$ through the path $R_1$, $R_2$, $C_2$, $N_1$, $N_2$, $R_3$. When the voltage on $C_2$ is sufficient to turn on transistor $Q_1$ ($V_{C2}=Q_1$'s cut-in voltage), then current flows from $C_3$ (and a small amount from $V_{cc}$ through $R_1$) through $Q_1$ from collector to emitter, and on through winding $N_2$ and $R_3$ to circuit common. The current through $N_2$ produces a flux $\phi_c$ which encircles each aperture. This flux induces a current in winding $N_1$ which reinforces the voltage already on $C_2$, causing $Q_1$ to saturate and quickly discharge $C_3$ through winding $N_2$, producing a substantial current in the process. This current spike is in turn coupled to winding $N_3$ which is connected to the base of transistor $Q_2$ in such a way as to initiate turn-on of that transistor.

The initiation of turn-on in transistor $Q_2$ allows current from $V_{cc}$ to begin flowing from collector to emitter through the transistor and on through windings $N_4$ and $N_6$. The current through $N_4$ is coupled back as base current via winding $N_3$ which results in a very quick saturation of transistor $Q_2$. The rapidity of saturation of $Q_2$ is enhanced by the voltage induced in winding $N_5$ as a result of current flow in main winding $N_6$, which results in current through $R_5$ reinforcing the current flowing from $N_3$ to the base of $Q_2$.

After power transistor $Q_2$ has become saturated, current increases linearly through main winding $N_6$ and the flux $\phi_m$ in the main core likewise increases linearly. Current is also increasing linearly through $N_3$ and $N_4$, so that the flux $\phi_c$ encircling the apertures $A_1$ and $A_2$ and which is transverse to the main flux $\phi_m$ initially also increases linearly. Transistor $Q_1$ meanwhile remains saturated by the current being induced in $N_1$ from $N_4$. As current through $N_4$ and $N_6$ continues to increase together with the magnitude of their associated fluxes $\phi_m$ and $\phi_c$, eventually the area to the right of aperture $A_1$ and to the left of aperture $A_2$ will begin to saturate. These areas are indicated by shading at 14 and 15 in FIG. 2. This happens because the fluxes $\phi_m$ and $\phi_c$ add on the right side of the aperture $A_1$ and on the left side of aperture $A_2$ but subtract on the left side of aperture $A_1$ and the right side of aperture $A_2$. Since the shaded areas represent regions in the magnetic circuit where flux density is increasing at a rate higher than in the rest of the magnetic circuit and since the core cross-section in these areas is limited, magnetic saturation will occur in these areas before other regions can saturate.

As the shaded areas of the core begin to saturate, coupling between $N_4$ and $N_3$ is reduced gradually at first and then rapidly drops to zero, thus reducing, then eliminating regenerative feedback from $N_4$ to $N_3$. However collector current continues to flow in transistor $Q_2$ due to the presence of minority carriers on each side of the base-emitter junction. Since saturation now prevents any further increase in flux in the shaded areas beside each aperture, main flux $\phi_m$ is forced to flow diagonally up the center leg entering to the right of lower aperture $A_2$ and exiting to the left of upper aperture $A_1$. The result of the flux deflection is that the flux now cuts the plane of the $N_3$ feedback turn in such a way as to cause a negative or reverse current flow out of the base of $Q_2$ causing very fast turn-off of transistor $Q_2$.

The interval from the moment when power transistor $Q_2$ is turned off to the moment when it is turned on again may be referred to as the flyback phase or period. The current that was flowing in the inductance formed by $N_6$ and the core ($L_{N6}$) now flows into the lower terminal of $C_4$, that is it charges $C_4$ negatively with respect to circuit common. The inductance $L_{N6}$ paralleled by $C_4$ forms a tank circuit and when the energy originally stored in $L_{N6}$ has all been transferred to $C_4$ as negative charge (minus losses), current flow reverses in oscillatory fashion and starts to charge $C_4$ positively.

During the time that power transistor $Q_2$ is saturated, current is being drawn by the load, that is by discharge lamp LU through the ballast inductor $L_1$; this current serves in part to store energy in $L_1$ and in part to sustain the arc in the lamp creating light and heat. When the voltage across $L_{N6}$ goes negative, the energy stored in $L_1$ must be returned to capacitor $C_1$ before current reversal can take place in the load after transistor turn-off. When power transistor $Q_2$ is turned off and the circuit is in the flyback period, energy to operate the discharge lamp comes from the tank circuit composed of inductor $L_{N6}$ and capacitor $C_4$. Just before the end of the flyback period, energy is stored in both $L_{N6}$ and $L_1$.

At the instant the voltage across $C_4$ reaches a value equal to $V_{cc}$ plus $D_1$'s forward voltage drop, diode $D_1$ begins to conduct, draining away energy stored in $L_1$ and $L_{N6}$ in the form of a current back to the capacitor $C_1$. When enough energy has been drained away that the voltage across $C_4$ can no longer be maintained at the level of $V_{cc}$ plus one diode drop, then $C_4$ begins to discharge back through $L_{N6}$ toward circuit common. This discharge current creates a flux in the main core which induces a voltage across winding $N_5$ in a direction which furnishes a regenerative base drive to transistor $Q_2$, turning it on. The turn-on of $Q_2$ is reinforced as before by current induced in winding $N_3$ by current flowing through transistor $Q_2$ and windings $N_4$ and $N_6$ to circuit common and saturation occurs again. The current through $N_4$ also turns on transitor $Q_1$ through current feedback to winding $N_1$, discharging any voltage appearing on $C_3$. Current now proceeds to increase linearly through $N_6$ and the cycle repeats.

While the invention has been described with reference to a particular embodiment utilizing the inductor in preferred inverter circuit, it will be understood that it is equally applicable to variants of the inductor configuration and of the inverter and that numerous modifications may be made by those skilled in the art without departing from the scope of the invention. The appended claims are intended to cover all such equivalent variations as come within the true spirit and scope of the invention.

What I claim as new and desire to secure by Letters Patent of the United States is:

1. A transformer for biflux operation comprising:
   - a core of substantially linear magnetic material in an E-E shell type configuration having a central winding leg and a pair of side legs joined thereto by yoke portions,
   - a pair of apertures extending transversely through the yoke portions of said core, one above and the other below said central winding leg,
   - a main winding encircling said central leg for generating a main flux in said core when current is supplied thereto,
   - and control windings threaded through said apertures and looping around said central leg for generating or responding to a transverse component of flux, said transverse component causing deflection of the main flux through the central leg to one or the other of two diagonal paths in which core regions on one side or the other of said apertures saturate before the main portion of said core.

2. A transformer as in claim 1 wherein said apertures are substantially equal in size and located substantially on the centerline of said central leg.

3. An inverter comprising, in combination with a transformer as in claim 1, an electronic switching device for periodically applying dc voltage across said main winding, one pair of control windings threaded through said apertures and providing feedback from the output to the input of said switching device as a result of linking by transverse flux in said core, and a control winding providing feedback from the output to the input of said switching device as a result of linking by the main flux in said core.

4. An inverter as in claim 3 wherein said switching device is a power transistor and said main winding is paralleled by a capacitor to form a blocking oscillator circuit.

5. An inverter as in claim 4 comprising additionally a relaxation oscillator comprising a signal transistor, an other pair of control windings threaded through said apertures and providing feedback from the output to the input of said signal transistor as a result of linking by transverse flux, said other pair of control windings providing coupling to said one pair of control windings for initiating turn-on of the power transistor.

6. A ballast for operating an electric discharge lamp comprising an inverter as in claim 5 and a reactor for connection in series with the lamp across a portion of said main winding.

* * * * *